United States Patent [19]

Ross

[11] 4,043,452

[45] Aug. 23, 1977

[54] C-RING HOLDER

[76] Inventor: Milton I. Ross, 400 College Ave., Haverford, Pa. 19041

[21] Appl. No.: 725,962

[22] Filed: Sept. 23, 1976

[51] Int. Cl.² .................................................. B65D 85/24
[52] U.S. Cl. ........................................ 206/343; 29/229;
29/413; 29/418; 29/453; 29/758; 85/8.8;
206/230; 206/231; 206/340; 206/346; 339/217 R
[58] Field of Search .................. 29/413, 418, 453, 229,
29/225, 757, 758, 760; 206/227, 229, 230, 231,
338, 340, 343, 346, 820, 345; 85/8.8, 51; 10/155
R, 155 A; 339/217 R

[56] References Cited

U.S. PATENT DOCUMENTS

| | | | |
|---|---|---|---|
| 2,811,702 | 10/1957 | Narozny | 206/820 X |
| 3,101,983 | 8/1963 | Horssen | 339/217 R X |
| 3,122,407 | 2/1964 | Cowe | 339/217 R |
| 3,396,461 | 8/1968 | Spooner et al. | 29/413 X |
| 3,496,517 | 2/1970 | Walter | 85/8.8 X |
| 3,780,433 | 12/1973 | Lynch | 339/217 R X |
| 3,846,900 | 11/1974 | Weglage | 206/343 X |
| 3,864,008 | 2/1975 | Bakermans | 206/343 X |

*Primary Examiner*—Victor A. Dipalma
*Attorney, Agent, or Firm*—Edelson and Udell

[57] ABSTRACT

A miniature electrical connector comprising an insulative body having spaced, parallel connector pins extending therethrough and held in place by a combination of abutment surfaces on the pins and block, and C-rings on the pins. In assembling the connector, the C-rings are formed as part of a metal stamping, and are urged as a unit onto corresponding ones of the pins extending through the body. The C-rings are released from the stamping by bending the latter along suitably formed fracture lines.

4 Claims, 9 Drawing Figures

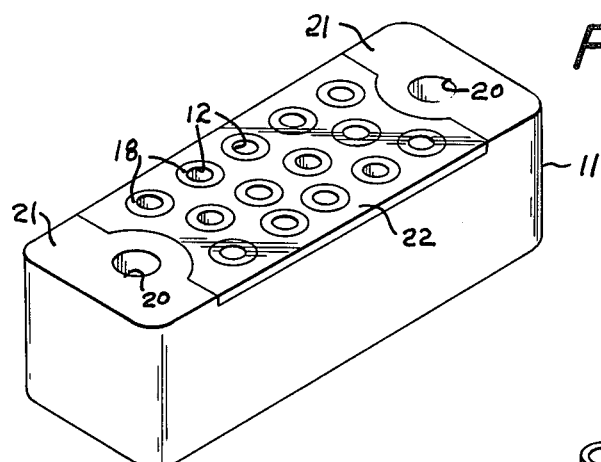
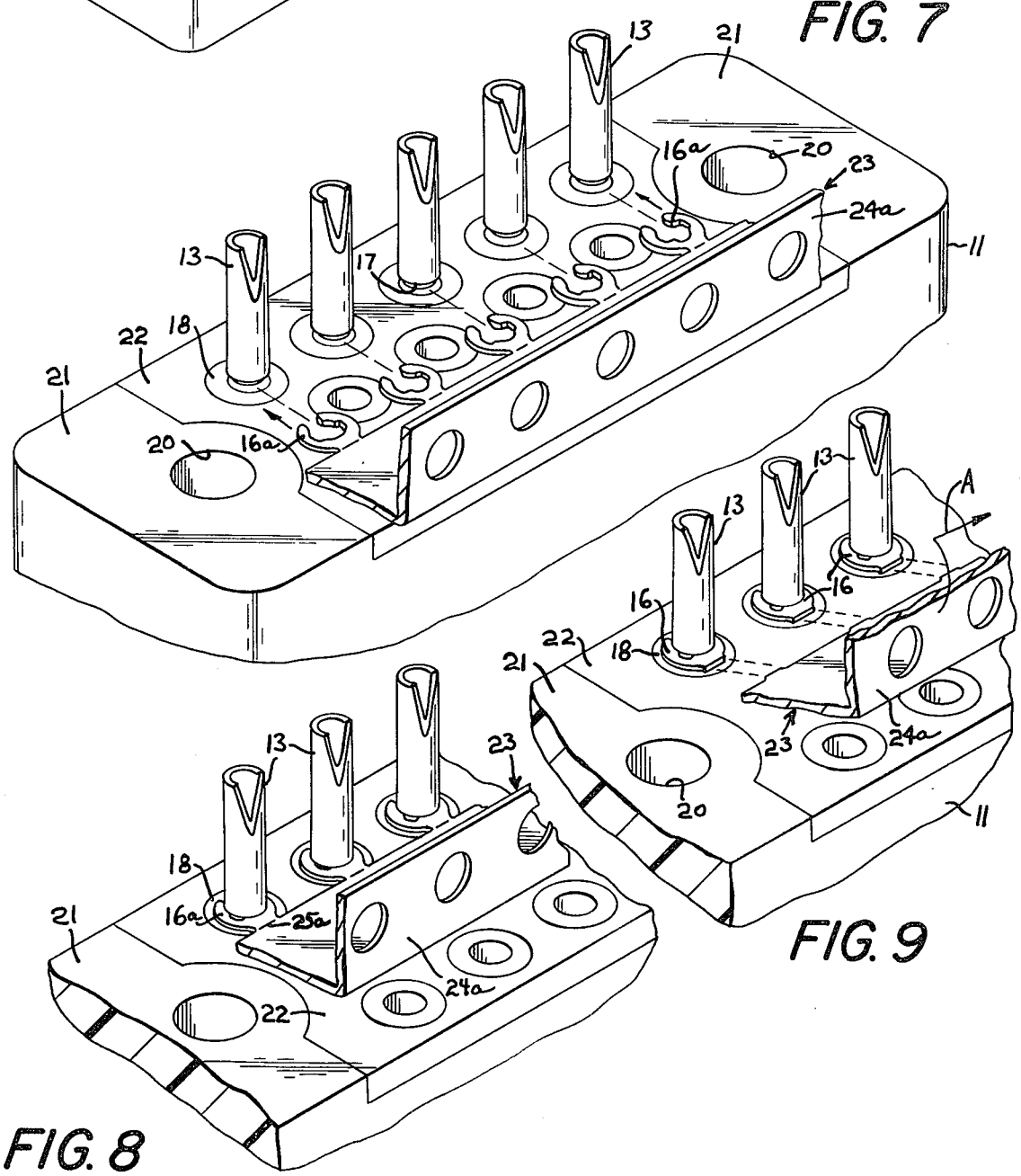

C-RING HOLDER

BACKGROUND OF THE INVENTION

This invention relates to electrical component assembly, and more particularly to an improved method and apparatus useful in the assembly of electrical connectors of the so-called miniature, subminiature, and microminiature types.

Connectors of the above-mentioned types comprise electrically insulative bodies of generally rectangular configuration and having closely spaced rows of closely spaced parallel tubular openings extending at right angles to opposed parallel surfaces of the connector bodies. Conductive pins extend through these openings beyond the aforesaid surfaces, and means are provided to retain the pins in the blocks. In view of the relatively close spacing of the pins, and of the large quantities thereof, it has been found convenient in the construction of such connectors to provide a shoulder within each tubular opening positioned to engage an offset portion of the pin upon its insertion from one side of the insulative body, and to retain the pin within the body by a C-ring received within an annular groove on the pin in the region of the opposite surface of the body. This construction affords a connector of suitable electrical characteristics and small dimension. Typically close pin spacings, in the order of 0.150 inch for miniature connectors, 0.125 inch for subminiature connectors, and 0.094 inch for microminiature connectors render an assembly operation somewhat difficult. For example, C-rings of suitably small size are supplied in bulk to an operator, who must individually select and orient each C-ring and attach it to a contact pin. Although operators become skilled at this operation, it is by its very nature time-consuming, especially when a single connector may have as many as 104 pins to be assembled into the insulative body.

It is an objective of this invention to provide an improved method and apparatus useful in the assembly of relatively small electrical connectors.

It is a further objective of the invention to provide an improved article of manufacture facilitating storage, orientation, and attachment of relatively small electrical connector components.

SUMMARY OF THE INVENTION

In achievement of the foregoing as well as other objectives and advantages, the invention contemplates provision of an electrically insulative body with connector pins extending therethrough as described above, disposition of a plurality of unitarily supported, unidirectionally presented C-rings in confronting relationship to said pins, moving said unitarily supported C-rings into frictional, resilient engagement with said pins, and releasing said C-rings from the recited support. The invention is featured by support of the C-rings by suitably formed frangible means capable of being fractured to release the pin-retained C-rings.

The manner in which the foregoing as well as other objectives and advantages of the invention may best be achieved will be more fully understood from a consideration of the following description, taken in light of the accompanying drawing.

BRIEF DESCRIPTION OF THE DRAWING

FIG. 6 is an assembled perspective view of the parts seen in FIG. 4, and illustrating a further step in the method;

FIG. 7 is a perspective view of the parts seen in FIGS. 5 and 6, and illustrating their cooperative relationship in carrying out a still further step in the method; and FIGS. 8 and 9 are fragmented perspective views illustrating further and final steps in the method contemplated by the invention.

DESCRIPTION OF THE PREFERRED PRACTICE OF THE INVENTION

Figure 1:
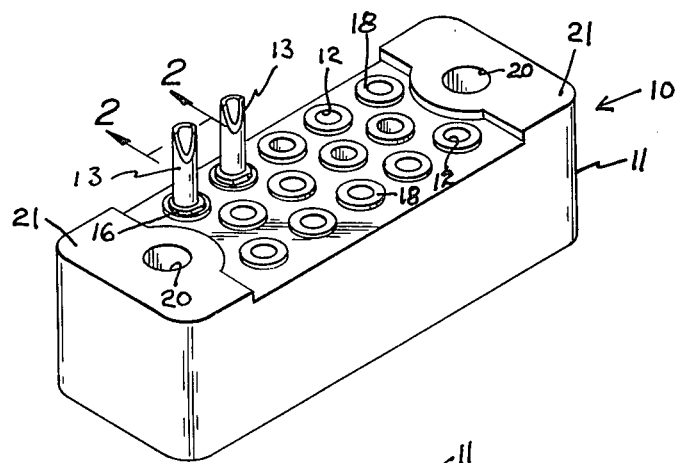
FIG. 1 is a perspective view, on a somewhat enlarged scale, of an electrical connector of a type to which this invention is particularly directed.
Figure 3:
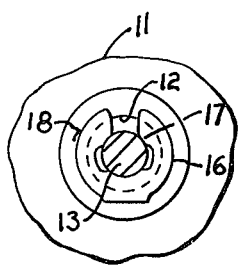
FIG. 3 is a sectional view, taken generally along the line indicated by arrows 3 — 3 applied to FIG. 2, and illustrating further structural features of the connector.
Figure 2:
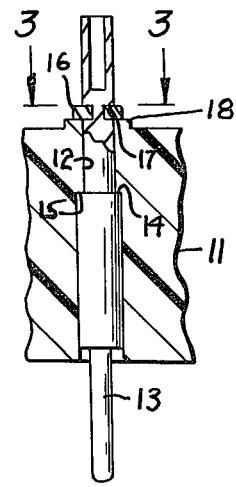
FIG. 2 is a sectional view, taken generally along the line indicated by arrows 2 — 2 applied to FIG. 1, and illustrating structural features of a connector assembled in accordance with the present invention.

With more detailed reference to the drawing, and first to FIGS. 1, 2, and 3, a connector 10 made in accordance with the method comprises a body such as block 11 of electrically insulative material having parallel rows of tubular openings 12. Electrically conductive connector pins 13, only two of which are shown for convenience of illustration, extend through openings 12, and transversely of opposed surfaces of block 11, as best seen in FIG. 2. Also as seen in FIG. 2, each pin 13 includes a shoulder 14 that abuts a similarly formed portion 15 of an opening 12, which shoulder 14 and portion 15 cooperate to establish the desired projections of opposite ends of a pin 13 as respects surfaces of block 11. Retention of each pin 13 is afforded by a C-ring 16 resiliently and frictionally retained within an annular groove 17 on the pin, and abuttingly engaging an annular boss 18 formed on the surface of block 11 about each opening 12. Block 11 includes mounting, or orientation, openings 20 at opposite ends thereof, and extending through surfaces of bosses 21 that are substantially coplanar with the surfaces of bosses 18.

In especial accordance with method aspects of the invention, reference will now be made to FIGS. 4 to 9. In these figures, the connector to be assembled includes but 14 apertures arranged in three rows (i.e. rows of 5, 4 and 5, respectively). This is for illustrative purposes only, it being understood that the number of connector pins and corresponding apertures may vary considerably, for example from less than 10 to more than 100.

Figure 4:
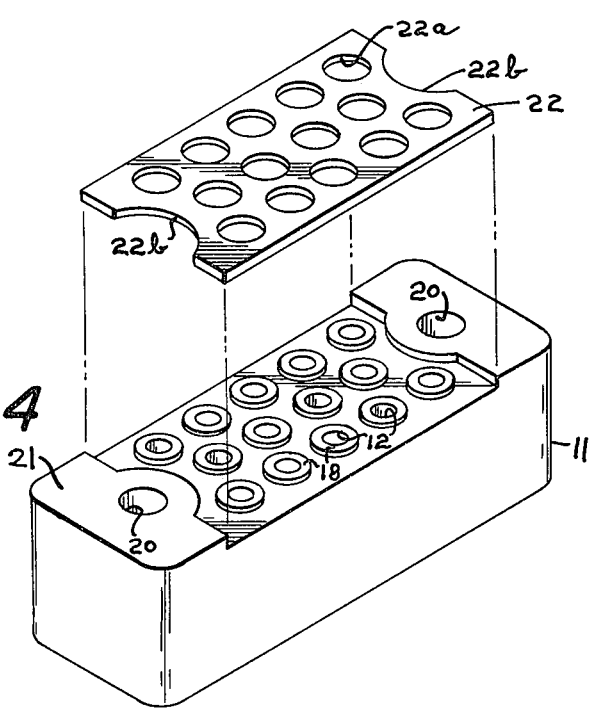
FIG. 4 is an exploded perspective view of a step in the assembly of the connector.

As seen in FIGS. 4 and 6, a levelling plate 22 having the thickness of raised bosses 18 and 21, and both apertured, as seen at 22a and 22b, and contoured to fit about the bosses, is placed on block 11, as seen in FIG. 6. Pins 13 are then inserted in a row of openings 12, to positions in which grooves 17 reside just above the coplanar surfaces of bosses 18, 21, and plate 22. The continuous upper surface about the pin grooves 17 thus presented to an operator advantageously facilitates carrying out the subsequent steps in the method.

Figure 5:
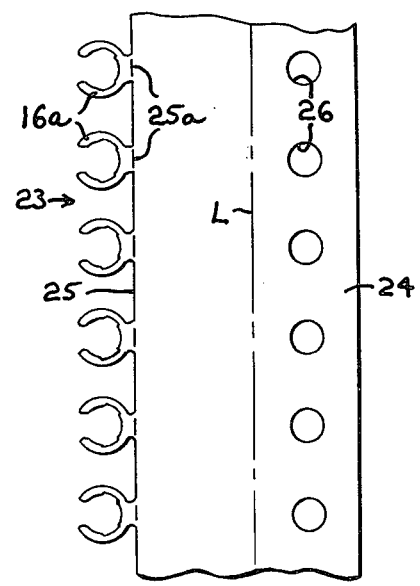
FIG. 5 is a view of a subassembly useful in carrying out the method.

With reference to FIG. 5, an article 23, for example a metal stamping, comprises a generally rectangular base portion 24 having an edge 25 provided with an aligned row of unidirectionally presented C-rings 16a. Article 23 conveniently is stamped from a suitable metal affording desired degree of resilience for the C-rings Center-to-center spacing of the C-rings 16a corresponds to the like spacing of pins 13. The line of juncture 25a of C-rings 16a to base 24 is scored, or otherwise rendered frangible, so that bendings, to be described in what follows, will release the C-rings. Further to the method, as shown in FIGS. 7, 8, and 9, base 24 may be angled along a line L conveniently to form a mounting portion 24a provided with apertures 26 facilitating grasping the base by hand. Alternatively, the base 24 may be in flat form as shown in FIG. 5 for utilization by suitable automatic ring-attachment apparatus (not shown).

Considering FIG. 7 in more detail, and with levelling plate 22 set in place, pins 13 are inserted upwardly from the lower ends of the rearmost row of openings 12. Insertion distance is controlled by the above described engagement of pin shoulder 14 with abutment surface 15 in opening 11. While pins 13 are suitably held in this position, for example by friction or by resting their lower ends on a rigid surface, a stamping 23 is suitably grasped by an attachment tool or by hand and moved toward pins 13 in a direction to cause spaced free ends of C-rings 16a to engage and resiliently snap into grooves 17 on pins 13, as is seen in FIG. 8. It will be appreciated that an operator need only align one C-ring 16a with a groove 17, and then slide the rings across the flush surface presented by levelling plate 22 and bosses 18.

Following the snapping in place of C-rings 16a and with reference to FIG. 9, the base 24 of stamping 23 is rotated upwardly about the scored regions 25a to fracture the connection of the base to the C-rings, followed by movement of base 24 away from the row of pins. This motion is indicated generally by the arrow A applied to FIG. 9.

The pin-inserting, C-ring-attaching, ring-attaching, and fracturing operations are repeated for each successive row, assuming the several rows of openings are to be provided with pins. Following attachment of C-rings 16 to fasten pins 13 in place, the levelling plate is removed, and the connector made ready for use.

It will be understood that the surface of block 11 may be continuous about openings 12, thus negating the need for plate 22. Also, a stamped article 23 may be fabricated in a strip longer than required, and cut to desired lengths as it is used. Moreover, in lieu of stamping, an article of manufacture 23 may be cast, or built-up by frangibly attaching the C-rings to a suitable support strip. It will be further understood that the disclosed method advantageously is adaptable to being performed using automatic machinery, and that the invention is susceptible to these as well as other modifications within the scope of the appended claims. It will be understood, also, that the term C-ring used throughout the disclosure to identify fastener 16 is to be given broad connotation, in contemplating use of various types of openended fasteners, such, for example, as wire snap rings, bifurcate spring clips, C-washers, and the like.

I claim:

1. An article of manufacture comprising means defining a base, and a row of unidirectionally presented C-rings supported on said base, support of said C-rings being provided by frangible means, and the center-to-center spacing of said C-rings corresponding to like spacing of connector pins to which the former may be attached as a unit, said frangible means affording breaking away of said base upon relative movement between it and the C-rings.

2. An article according to claim 1 and characterized in that said base and said C-rings are formed as a metal stamping, and in that said frangible means comprises weakened sections in the region of juncture of said C-rings and said base.

3. An article according to claim 2, and further characterized in that said base is of elongate, generally ribbon-shape.

4. An article of manufacture comprising in combination, base means, and an array of spaced apart unidirectionally presenting C-rings connected to said base means by rings releasing means, the openings of said C-rings being oriented so that all C-rings may be simultaneously engaged about correspondingly positioned C-ring receiving elements when said base is moved rectilinearly, and said rings releasing means being operable to release said C-rings from said base means after said rings have been engaged with said rings receiving elements.

* * * * *